A. J. SLONECKER.
TRANSMISSION MECHANISM.
APPLICATION FILED JAN. 2, 1915. RENEWED APR. 24, 1916.
1,206,043.
Patented Nov. 28, 1916.
2 SHEETS—SHEET 2.
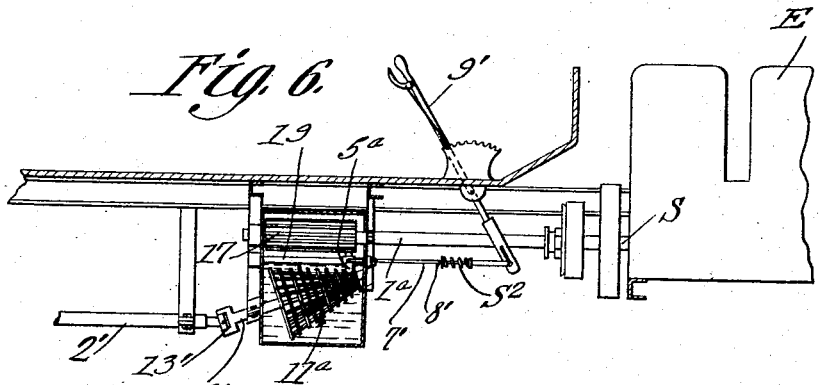
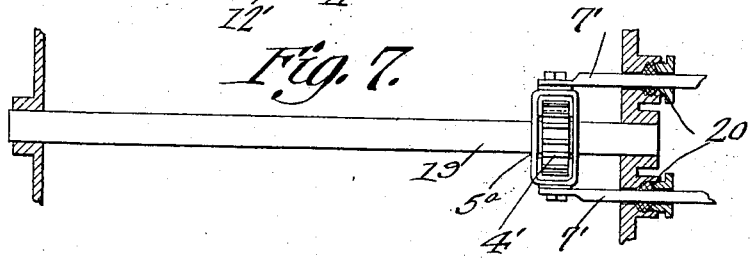
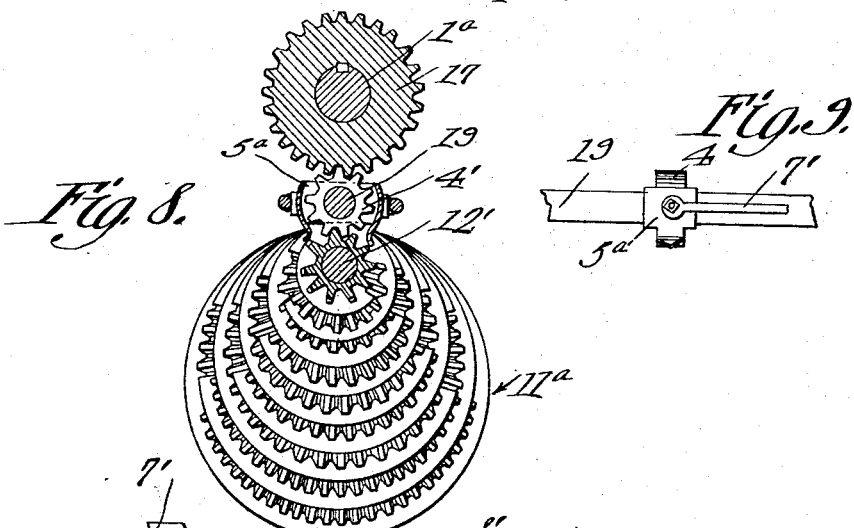
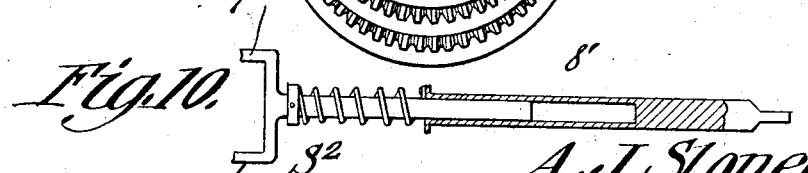
Witnesses
A. J. Slonecker
Inventor
by
Attorneys

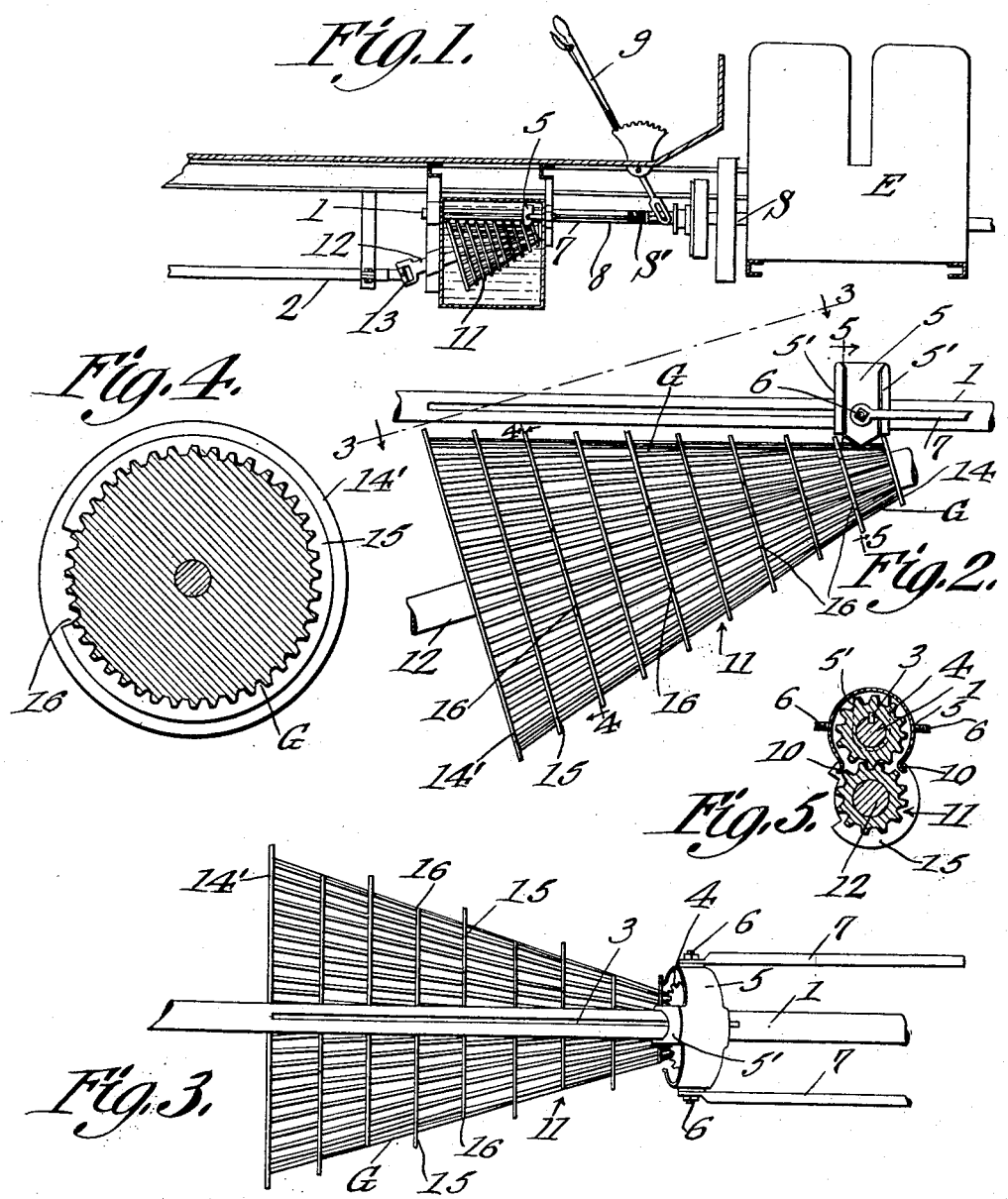

UNITED STATES PATENT OFFICE.

ABIRAM J. SLONECKER, OF TRENTON, MISSOURI.

TRANSMISSION MECHANISM.

1,206,043. Specification of Letters Patent. Patented Nov. 28, 1916.

Application filed January 2, 1915, Serial No. 136. Renewed April 24, 1916. Serial No. 93,252.

*To all whom it may concern:*

Be it known that I, ABIRAM J. SLONECKER, a citizen of the United States, residing at Trenton, in the county of Grundy and State of Missouri, have invented a new and useful Transmission Mechanism, of which the following is a specification.

The present invention relates to improvements in a transmission mechanism, the same being of a type that may be readily applied in connection with automobiles, marine and stationary engines or the like, one object of the invention, being the provision of a frusto-conical member composed of a plurality of gears, each gear of which is separated by a mutilated segregating member so that the coöperating gear is adapted to coöperate with one of the gears at a time of the frusto-conical member, which may be placed in proper relation to such member so that various speeds will be transmitted through the coöperating gears, the frusto-conical member either constituting the driving or driven member as may be found most desirable.

A further object of the present invention, is the provision of a transmission mechanism of this character in which the parts are easily assembled and by means of which the progression from one speed to another is readily accomplished, the parts being so arranged as to permit of the easy direction of the sliding gear from one gear section to the other of the frusto-conical member so that there will not be any tendency to injure the teeth and so that the movement from one gear to the other will be made without interruption.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings, Figure 1 illustrates one form of transmission as applied to an automobile engine and the driven shaft thereof. Fig. 2 is a side elevation of the frusto-conical member and the slidable gear showing the respective driving and driven members thereof. Fig. 3 is a top plan view of the same taken upon the dotted line 3—3 of Fig. 2. Fig. 4 is a section taken on line 4—4 of Fig. 2. Fig. 5 is a section taken on line 5—5 of Fig. 2. Fig. 6 is a view similar to Fig. 1 showing a modified arrangement of the present transmission mechanism. Fig. 7 is a top plan view of the sliding gear and its carrying shaft. Fig. 8 is a cross-section taken through the apex of the frusto-conical member and the adjacent portion of the sliding gear and the cylindrical gear member. Fig. 9 is a top plan view of the sliding gear member and its shaft. Fig. 10 is a detail view of the progressive gear actuating rod connection.

Referring to the drawings, the numeral 1 designates the driven shaft which is connected in the usual manner to the crank shaft S of the explosion engine E, while 2 designates the driven shaft. Although these elements are shown as applied to an automobile, it is apparent that the present transmission mechanism may be applied to marine engines, to lathes, and to other mechanism where it is desired to have a change of speed.

The driving shaft 1 is provided with a spline 3, upon which is slidably mounted for rotation therewith, a small driving gear 4. This gear 4 is surrounded by a casing 5, which is provided with the supporting ears 5′, which surround the shaft 1 to permit of the gear 4 to be slid thereupon. The casing 5 is provided with the oppositely disposed pins 6, to which are pivotally connected the telescopic rods 7, which are extended toward the engine and are slidably connected to the end 8 of the manually controlled selectively actuated lever 9. By this means, the gear 4 and the casing 5 are slid upon the shaft 1 longitudinally thereof, but as the gear is splined thereto, the same will rotate with the shaft 1. The casing 5 is provided with the two depending lugs or projections 10, which constitute, as will presently appear, means for coöperating with the ends 16 of the respective mutilated segregating members or rims 15 which in turn are carried by the frusto-conical transmission member 11. This member 11 is fast upon the shaft 12, and such shaft 12 is connected by the flexible connection 13 to the driven shaft 2, so that the rotation of the member 11 will consequently rotate the shaft 2.

The member 11 is provided at its ends with the rings or disks 14 and 14′, and with the spaced mutilated rims 15, between each two of which formed upon the periphery of the member 11, are the speed gears G, there being shown in the present instance nine of these gears, so that with the present member, there can be nine changes of speed due to the meshing of the gear 4 with any one of the respective gears or gear sections G.

Where the respective gears or gear sections G are in alinment with the space between the ends 16 of the segregating members 15, the teeth extend from the opposite rings 15, so that the gear 4 may slide from one gear G to the next without any interruption, such spaces between the ends 16 alternating to be upon diametrically opposite sides of the member 11.

In order to provide a means for assisting in the progressive movement of the gear 4 from one gear section G to the other, there is interposed between the sections of the rods 7 and the connection 8, a spring S', which permits the lever 9 to be pushed forwardly so as to force the gear 4 rearwardly, such spring taking up any movement therebetween and causing the gear 4 to bear against the next rim or segregating member 15 so that the instant the space between the ends 16 thereof is encountered by the gear, the gear will quickly snap through such space and abut the next succeeding rim or segregating member 15 and thus be quickly snapped into position to engage the next succeeding gear section G of the member 11. This construction will render it unnecessary to "feel" the movement of the gear 4 in moving from one position to the other, a continued pulling or pushing upon the lever 9 causing the spring S' to effect the gear 4, so that at each half rotation of the member 11, the gear 4 will have such movement imparted thereto throughout the series of gear sections G of the member 11.

In the construction of mechanism shown in Figs. 6, 7, 8 and 9, the driving shaft 1ª has fast thereupon, the long gear 17, while interposed therebetween and the member 11ª, which is similar to the member 11 heretofore described, is a stationary shaft or support 19, upon which is slidably and rotatably mounted, the selecting gear 4', which is incased in the casing 5ª and operated through the rods 7', the spring S², the connection 8', and the manually controlled lever 9', these parts corresponding to the parts heretofore described.

The gear 4' is therefore maintained in mesh at all times with one of the gear sections of the member 11ª and also the gear 17 so that power is transmitted from the gear 17 through the gear 4' to one of the gear sections of the member 11ª and consequently to the shaft 12' and the flexible connection 13' to the driven shaft 2'.

As shown in Fig. 7, the rods 7' are disposed to slide through stuffing boxes 20 so as to provide for a straight line movement when the gear 4' is slid upon the shaft or rod 19.

Although the member 11 or 11ª has been shown as the driven member, it is apparent that the same can be the driving member and that the various parts be reversed from that illustrated.

What is claimed is:

1. A transmission mechanism, including a driving and a driven element, a frusto-conical member having a plurality of gears, a plurality of circumferential and mutilated gear segregating members carried thereby, and a progressively operated gear for intermeshing with one gear at a time of the frusto-conical member and forming with the gear of the frusto-conical member, a transmission connection between the driving and driven elements.

2. A transmission mechanism, including a driving and a driven element, a frusto-conical member having a plurality of gears, a plurality of circumferential and mutilated gear segregating members carried thereby, a slidably mounted gear, and manually controlled means for sliding said gears so that one gear at a time of the frusto-conical member may be engaged, and whereby the gear of the frusto-conical member and the sliding gear constitutes a transmission connection between the driving and driven elements.

3. A transmission mechanism, including a driving and a driven element, a frusto-conical member having a plurality of gears, the adjacent gears of the same at a single point of the circumference having alined teeth, a plurality of circumferential and mutilated gear segregating members carried by the frusto-conical member, the mutilated portion of the same being adjacent the alined gear teeth of the plurality of gears, and a progressively operated gear for intermeshing with one gear of the frusto-conical member at a time and forming with such gear a transmission connection between the driving and driven elements.

4. A transmission mechanism, including a driving and a driven element, a frusto-conical member having a plurality of gears, the adjacent gears of the same at a single point of the circumference having alined teeth, a plurality of circumferential and mutilated gear segregating members carried by the frusto-conical member, the mutilated portion of the same being adjacent the alined gear teeth of the plurality of gears, and manually controlled means for sliding said gears so that one gear at a time of the frusto-conical member may be engaged, and whereby the gears of the frusto-conical member and the sliding gear constitute a transmission connection between the driving and driven elements.

5. A transmission mechanism, including a driving and a driven element, a frusto-conical member having a plurality of gears, a plurality of circumferential and mutilated gear segregating members carried thereby, a progressively operated gear for intermeshing with one gear at a time of the frusto-conical member and forming with the gear of the frusto-conical member a transmission connection between the driving and driven elements, and an end ring carried by the frusto-conical member and constituting a limiting means for the movement of the progressively operated gear.

6. A transmission mechanism, including a driving and a driven element, a frusto-conical member having a plurality of gears, a plurality of circumferential and mutilated gear segregating members carried thereby, a slidably mounted gear, manually controlled means for sliding said gears so that one gear at a time of the frusto-conical member may be engaged, and whereby the gear of the frusto-conical member and the sliding gear constitutes a transmission connection between the driving and the driven elements, and an end ring carried by the frusto-conical member and constituting a limiting means for the progressively operated gear.

7. A transmission mechanism, including a driving and a driven element, a frusto-conical member having a plurality of gears, the adjacent gears of the same at a single point of the circumference having alined teeth, a plurality of circumferential and mutilated gear segregating members carried by the frusto-conical member, the mutilated portion of the same being adjacent the alined gear teeth of the plurality of gears, a progressively operated gear for intermeshing with one gear of the frusto-conical member at a time and forming with such gear a transmission connection between the driving and driven elements, and an end ring carried by the frusto-conical member and constituting a limiting means for the progressively operated gear.

8. A transmission mechanism, including a driving and a driven element, a frusto-conical member having a plurality of gears, the adjacent gears of the same at a single point of the circumference having alined teeth, a plurality of circumferential and mutilated gear segregating members carried by the frusto-conical member, the mutilated portion of the same being adjacent the alined gear teeth of the plurality of gears, manually controlled means for sliding said gears so that one gear at a time of the frusto-conical member may be engaged and whereby the gears of the frusto-conical member and the sliding gear constitute a transmission connection between the driving and driven elements, and an end ring carried by the frusto-conical member and constituting a limiting means for the progressively operated gear.

9. A transmission mechanism, including a driving and a driven shaft, a frusto-conical member having a plurality of gears connected to one of said shafts, a plurality of circumferential and mutilated gear segregating rims carried by the frusto-conical member, the mutilated portion of each rim alternating throughout the series thereof and the teeth of the gears at such mutilated portions being alined to permit of a directing means to the mutilated portion of the rim, and a progressively operated gear operatively connected to the other shaft for engaging one gear of the frusto-conical member at a time and coöperating with such gear of the frusto-conical member to form a transmission connection between the shafts.

10. A transmission mechanism, including a driving and a driven shaft, a frusto-conical member having a plurality of gears connected to one of said shafts, a plurality of circumferential and mutilated gear segregating rims carried by the frusto-conical member, the mutilated portion of each rim alternating throughout the series thereof and the teeth of the gears at such mutilated portions being alined to permit of a directing means to the mutilated portion of the rim, a progressively operated gear operatively connected to the other shaft for engaging one gear of the frusto-conical member at a time and coöperating with such gear of the frusto-conical member to form a transmission connection between the shafts, and a rim attached to the respective ends of the frusto-conical member and constituting a limiting means to prevent the progressively operated gear from getting out of mesh with the respective end gears of the frusto-conical member.

In testimony that I claim the foregoing as my own, I have hereto affixed my signature in the presence of two witnesses.

ABIRAM J. SLONECKER.

Witnesses:
G. W. FREY,
A. T. SLONECKER.